US012392481B1

(12) United States Patent
Kernan et al.

(10) Patent No.: US 12,392,481 B1
(45) Date of Patent: Aug. 19, 2025

(54) LANDSCAPE LIGHTING WIRING HUB WITH WIRELESS SIGNAL REPEATER

(71) Applicant: VOLT, LLC, Lutz, FL (US)

(72) Inventors: Chris Kernan, Tampa, FL (US); Nolan Bello, North Aurora, IL (US); Paul Kolenda, Batavia, IL (US); Yanfei Shen, Nanjing (CN)

(73) Assignee: Volt, LLC, Lutz, FL (US)

( * ) Notice: Subject to any disclaimer, the term of this patent is extended or adjusted under 35 U.S.C. 154(b) by 0 days.

(21) Appl. No.: 18/671,606

(22) Filed: May 22, 2024

(51) Int. Cl.

| | |
|---|---|
| ***F21V 23/00*** | (2015.01) |
| ***F21S 8/08*** | (2006.01) |
| ***F21V 21/08*** | (2006.01) |
| ***F21V 23/04*** | (2006.01) |
| ***F21V 23/06*** | (2006.01) |
| ***F21V 31/00*** | (2006.01) |
| ***H05B 47/19*** | (2020.01) |

(52) U.S. Cl.
CPC ............ *F21V 23/008* (2013.01); *F21S 8/081* (2013.01); *F21V 21/0824* (2013.01); *F21V 23/002* (2013.01); *F21V 23/0435* (2013.01); *F21V 23/06* (2013.01); *F21V 31/005* (2013.01); *H05B 47/19* (2020.01)

(58) Field of Classification Search
CPC ...... F21V 23/008; F21V 23/002; F21V 23/06; F21V 23/0435; F21V 21/0824; F21V 31/005; H05B 47/19; F21S 8/081
See application file for complete search history.

(56) References Cited

U.S. PATENT DOCUMENTS

| | | | | |
|---|---|---|---|---|
| 8,445,826 | B2 | 5/2013 | Verfuerth | |
| 8,598,993 | B2 * | 12/2013 | Rodriguez | H05B 47/19 340/13.24 |
| 8,634,764 | B2 | 1/2014 | Cruz | |
| 8,884,531 | B1 * | 11/2014 | Xu | H05B 45/00 362/183 |
| 8,994,276 | B2 * | 3/2015 | Recker | H05B 47/16 315/175 |
| 10,085,317 | B2 * | 9/2018 | Foster | H04L 12/2836 |
| 10,149,370 | B2 * | 12/2018 | Greene | H04W 40/22 |
| 10,364,972 | B1 * | 7/2019 | Breedlove, Sr. | F21V 15/01 |
| 10,405,406 | B2 | 9/2019 | Liszt | |
| 10,405,409 | B2 | 9/2019 | Kurihara | |
| 10,455,663 | B2 * | 10/2019 | Greene | H05B 47/11 |
| 10,663,128 | B2 | 5/2020 | Abbott | |
| 10,941,910 | B1 * | 3/2021 | Harper | F21S 8/081 |
| 10,976,038 | B1 * | 4/2021 | Breedlove, Sr. | F21V 23/06 |

(Continued)

FOREIGN PATENT DOCUMENTS

WO WO-2010080565 A1 * 7/2010 ............. F21K 9/232

OTHER PUBLICATIONS

VOLT Brand "Pro Junction Hub" <https://www.voltlighting.com/pro-junction-wire-hub>.

(Continued)

*Primary Examiner* — Zheng Song
(74) *Attorney, Agent, or Firm* — Carlton Fields, PA; Eleanor M. Yost

(57) ABSTRACT

A non-metallic wiring junction hub for connecting power to outdoor landscape lighting fixtures that features a repeater assembly containing electronics to receive and re-transmit wireless communications signals in a BLE mesh network used to control the lighting fixtures.

20 Claims, 4 Drawing Sheets

(56) References Cited

U.S. PATENT DOCUMENTS

| | | | | |
|---|---|---|---|---|
| 11,346,537 | B1 | 5/2022 | Breedlove, Sr. | |
| 11,493,194 | B2 | 11/2022 | De Jong | |
| 11,612,044 | B1 | 3/2023 | Hedman | |
| 11,683,877 | B2 | 6/2023 | Barth | |
| 2005/0164630 | A1 * | 7/2005 | Kates | H05B 47/19 455/10 |
| 2008/0211412 | A1 | 9/2008 | Altamura | |
| 2012/0086560 | A1 | 4/2012 | Ilyes | |
| 2013/0134891 | A1 | 5/2013 | Woytowitz | |
| 2014/0218913 | A1 | 8/2014 | Cozzolino | |
| 2015/0373556 | A1 * | 12/2015 | Oren-Pines | H04B 10/27 398/115 |
| 2019/0056072 | A1 | 2/2019 | Gielen | |
| 2019/0306960 | A1 * | 10/2019 | Cho | H04B 7/155 |
| 2020/0029411 | A1 | 1/2020 | Barna | |
| 2020/0068627 | A1 * | 2/2020 | Zhang | H05B 47/19 |
| 2021/0262647 | A1 | 8/2021 | De Jong | |
| 2021/0280967 | A1 | 9/2021 | Wu | |
| 2021/0410257 | A1 | 12/2021 | Cho | |
| 2022/0148426 | A1 | 5/2022 | Longardner | |

OTHER PUBLICATIONS

Competitive range extender https://allianceoutdoorlighting.com/lighting-products/bt-system-range-extenders/.

BLE 5.0 https://www.bluetooth.com/bluetooth-resources/bluetooth-5-go-faster-go-further/.

* cited by examiner

LANDSCAPE LIGHTING WIRING HUB WITH WIRELESS SIGNAL REPEATER

FIELD OF THE INVENTION

The present invention relates to a smart junction hub for an outdoor landscape lighting system that connects lighting fixtures and other devices to a power source via a wire termination and connection device, and further features a wireless signal repeater assembly disposed in the interior of the smart junction hub's non-metallic body for use in a wireless network communications system.

BACKGROUND OF THE INVENTION

Outdoor landscape lighting systems are used in both commercial and residential settings for the illumination of structures, walkways, trees, shrubbery, etc. Many outdoor landscape lighting systems feature a plurality of lighting fixtures and other devices. Lighting fixtures must be connected to an electrical power source. The operation of the lighting fixtures must also be controlled.

In an outdoor landscape lighting system, lighting fixtures and other devices may receive power via wires carrying electricity from a power source to each individual lighting fixture or device. Users or installers may find it difficult and time consuming, however, to install multiple lighting fixtures in a system to a power source. For example, the user may spend considerable time and employ various tools to run wires connecting each of the lighting fixtures in parallel with the power source. If a problem arises in the outdoor landscape lighting system having this configuration, the user may have difficulty troubleshooting where the problem exists. Even further, if a lighting fixture or other device must be repaired or removed from the outdoor landscape lighting system, or if an additional lighting fixture or device is added to the outdoor landscape lighting system, the user may find it difficult and time consuming to modify the layout of lighting fixtures and devices after an initial installation, or adjust wiring connections from the lighting fixtures to a power source.

One way to facilitate making the physical, electrical connections between each of the lighting fixtures and other devices in an outdoor lighting system is to bring each lighting fixture wire together to a single location and connect them to a power source via a junction hub, also known as a wiring hub or junction box. One example of such a junction hub is the VOLT® brand "Pro Junction Hub" (https://www.voltlighting.com/pro-junction-wire-hub) described in U.S. Pat. Nos. 10,364,972 and 11,346,537 and available from Volt, LLC of Florida. The junction hub is connected to a power source such as an electrical outlet or transformer via a power source wire. Lighting fixture wires are run between each lighting fixture and the junction hub, where each wire is inserted into the body of junction hub through openings or ports in the junction hub's body. A stripped end of each wire is secured with a rail-mounted clamp-type connector to an insulated electrical connector like a termination block disposed in the interior of junction hub's body. Benefits of this connection method include the ability to quickly connect and disconnect wires after installation of the outdoor lighting system's lighting fixtures and other devices, and further, the ability to test voltage at a single point for easy troubleshooting.

The operation of lighting fixtures in an outdoor landscape lighting system must also be controlled. Users, particularly of residential systems, may prefer to control each lighting fixture or groups of lighting fixtures remotely rather than through nearby switches. Within a home, "smart home" technologies are becoming a common way to operate a variety of fixtures, especially indoor lighting. These technologies may permit a user to turn on or off or otherwise operate lighting fixtures or other devices via a centralized control panel, or through the cloud accessed by running software running on a computer and application on a mobile device. The control panel or software is operable to cause a wireless signal router to transmit signals over a wireless communications network to the lighting fixtures, which are fitted with wireless communication devices. Users enjoy the convenience of controlling different aspects of a home's fixtures from a control panel, computer, or smartphone.

One example of a network protocol used for managing and controlling lighting fixtures is Bluetooth Low Energy (Bluetooth LE, colloquially BLE, formerly marketed as Bluetooth Smart), a wireless personal area network technology designed and marketed by the Bluetooth Special Interest Group. Nokia Corporation developed the original specification in 2006 under the name Wibree, which was integrated into Bluetooth in 2009 as Bluetooth Low Energy. BLE a wireless technology adapted from the Bluetooth standard to provide lower power usage and cost. Bluetooth mesh profiles use Bluetooth Low Energy to communicate with other Bluetooth Low Energy devices in the network. Each device can pass the information forward to other Bluetooth Low Energy devices, thereby creating a "mesh" effect. This enables, for example, the ability to switch all the lights in a building from a single smartphone.

Other wireless network systems link various devices to a router. This router collects and distributes the commands and data to the various devices called "nodes." If the router becomes disabled, the system fails. BLE systems, in contrast, remove the router or gatekeeper device from the system. Instead, the network uses each independent node to relay commands to their eventual destination. These systems refer to this means of transmission as "flooding." Flooding means there are numerous paths to a message that can make it to a node. So, as long as most of the nodes function, the command can still reach its final destination.

There are several drawbacks to controlling elements of an outdoor landscape lighting system using traditional "smart home" technologies, however. For example, smart lighting fixtures or smart light bulbs and similar lighting devices require a strong wireless signal to function correctly. Most wireless network systems designed for residential and commercial applications, however, are not designed to maintain sufficient signal strength outside of a building or structure to effectively control the elements of an outdoor landscape lighting system, which may be located far apart. Because of weak wireless signals, or the distance between lighting fixtures and the signal source, adding additional devices to the outdoor landscape lighting system such as extenders or repeaters may be required in order to extend the range of or increase or "boost" signal strength to effectively control all the devices in the system. In control systems that use wireless protocols such as Bluetooth Low Energy (BLE) mesh networks, for example, there is often a need to "repeat and boost" the wireless signals due to distance, obstacles, or other impediments. But installing several standalone repeater or extender devices in an outdoor landscape lighting system may increase the system's overall cost and increase the complexity associated with a system's layout, installation, and maintenance. Plus, a user may not wish an outdoor landscape lighting system to include numerous unsightly components, or may have difficulty running additional wires over long distances to connect repeater or extender devices.

Outdoor landscape lighting systems may also feature devices requiring connections to a power source, but compared to an indoor smart home system, outside there may be significantly fewer outdoor plugs or power sources available, or they may be located far from the location of a lighting fixture or device.

Further, unlike the devices in traditional smart home systems, the devices used in outdoor landscape lighting systems must be designed to operate in a variety of weather conditions. For example, devices in an outdoor landscape lighting system must be able to tolerate wet or damp conditions and avoid intrusion of dirt or debris in electrical connections. Devices that connect to electric power sources must also be weather tight or weather resistant to avoid an electrical short or damage to a device from water. Humidity, temperature, and rainfall can also interfere with wireless signals. These weather events may also reduce the power and range of any device used in the system, so devices having enough power and weatherproofing features to compensate for these factors are required in an outdoor landscape lighting system.

Further, the installation process, especially for systems including wireless network components, can be complex, particularly for users or installers who are not tech-savvy. And not all outdoor lighting fixtures are compatible with the most common smart home technologies. Some systems, for example, may require specific types of light bulbs, devices, or additional equipment like bridges to function correctly.

These challenges can make the process of selecting, installing, and controlling outdoor landscape lighting systems and their components more difficult and expensive than comparable indoor smart lighting or smart home systems.

There are a number of U.S. patents directed to outdoor landscape lighting systems having specialized devices such as junction hubs to enable the efficient electrical connection of lighting fixtures and other devices to power sources, including U.S. Pat. No. 11,346,537 issued to Breedlove, et al., which discloses, among other things, an outdoor lighting system having a junction hub featuring a wire termination and connection device for electrically connecting wired lighting fixtures to a power source. Junction hubs are used to create a "hub and spoke" wiring configuration within the system.

However, junction hubs do not typically provide additional components like a repeater assembly for a wireless network to extend the range of wireless signals and thereby improve the control and operation of connected lighting fixtures. Problematically, however, junction hub devices may be fabricated using metal or other materials to improve durability or to address outdoor weather conditions, but these may interfere with repeater assembly components and adversely affect wireless network signals.

There also exist a number of U.S. patents directed to outdoor landscape lighting systems featuring radio frequency (RF) or power line communication (PLC)-enabled lighting fixtures wherein each lighting fixture is fitted with components to communicate with a wireless network.

For example, U.S. Patent Appl. Pub. No. 4020/0029411 to Barna, et al., for example, discloses client lighting devices each having a radio for receiving wireless control signals and a "hub," featuring a different type of radio for wireless communication with a lighting controller, to form a two-layer control network. The "hub" of Barna, however, does not also facilitate the physical, electrical connection of client lighting device wires to a power source.

Similarly, U.S. Patent App. Pub. No. 2012/0086560 to Ilyes, et al. describes a street light system featuring RF-enabled outdoor streetlamps for roadways that are each wirelessly connected to form one or more mesh networks. The lighting system further includes a control system, and a bridging component such as a modem. Ilyes, however, does not disclose a junction hub for converging wires connected to the streetlamps and electrically connect each lighting fixture to a power source that also provides a repeater assembly to improve wireless communication network signals.

The inventions described herein seek to overcome these and other difficulties in the art to create a versatile, convenient, and efficient outdoor landscape lighting system by providing a junction hub device suitable for outdoor use to connect lighting fixture wires to a power source in a hub-and-spoke configuration via a wire termination and connection device disposed within the interior of a smart junction hub, and further featuring a repeater assembly disposed in the interior of the smart junction hub's non-metallic body, thereby avoiding the need for an unsightly external antenna disposed on the outside of the smart junction hub or elsewhere, and which maintains the smart junction hub's low-profile design suitable for landscape use.

The inventions described herein also avoid the need to add one or more standalone wireless signal routers, boosters, or extender devices to the outdoor landscape lighting system, thereby enabling more successful remote control of outdoor lighting fixtures.

The junction hub described herein solves the dual problems of providing power to each lighting fixture in an efficient way, thereby permitting easier installation, modification, and troubleshooting of lighting fixtures and wiring in the overall outdoor landscape lighting system, and also providing wireless network signal improving components like a repeater assembly within the same device body, which is designed to not interfere with network signal communication.

SUMMARY OF THE INVENTION

The inventions described herein provide in one aspect an outdoor landscape lighting system having a smart junction hub comprising a non-metallic body comprising a cap and a base that are removably connectable and together to define an interior. The smart junction hub further comprises a wire termination and connection device disposed in the interior of the non-metallic body for facilitating the connection of a power source to one or more lighting fixtures, and a repeater assembly to facilitate communication on a wireless network for controlling the lighting fixtures. The wire termination and connection device and repeater assembly are preferably affixed or mounted to the cap of the non-metallic body.

In some exemplary embodiments, the smart junction hub further includes a mount connection for optionally coupling a mounting device like a ground stake to the smart juncture hub. The mount connection may be in the form of a boss having exterior threads thereon for removably coupling the mounting device. The boss may also be hollow or a feature a central bore for permitting a power source wire, or one or more lighting fixture wires, to pass from the exterior of the smart junction hub's non-metallic body to the interior in order to be attached to the wire termination and connection device. A cover, stopper, lid, cap, or other form of closure may be situated over or in the bore to seal the opening when not in use.

In some exemplary embodiments, the wire termination and connection device comprises a first polarity terminal portion and a separate second polarity terminal portion. The first polarity terminal portion may be disposed on a first side of a partition wall, and the second polarity terminal portion may be disposed on a second side of the partition wall. The partition wall in some exemplary embodiments may comprise at least one opening for receiving a fastener that operably couples the first polarity terminal portion to the second polarity terminal portion. The wire termination and connection device may also comprise ports in which wires may be releasably secured.

Another aspect of the present invention provides an outdoor landscape lighting system comprising a power source and a plurality of lighting fixtures. A smart junction hub is also provided having a non-metallic body comprising a cap and a base that when coupled together define an interior of the non-metallic body. The smart junction hub further comprises a mount connection integrally formed with or affixed or coupled to the non-metallic body. A wire termination and connection device for facilitating the connection of the power source to the lighting fixture(s), and a repeater assembly for extending the range of a wireless network that uses wireless signals in accordance with the Bluetooth Low Energy protocol to control the operation of the components of the outdoor landscape lighting system, are both disposed in the interior of the non-metallic body.

Those skilled in the art will appreciate the scope of the present invention and realize additional aspects thereof after reading the following detailed description of example embodiments in association with the accompanying drawing figures.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
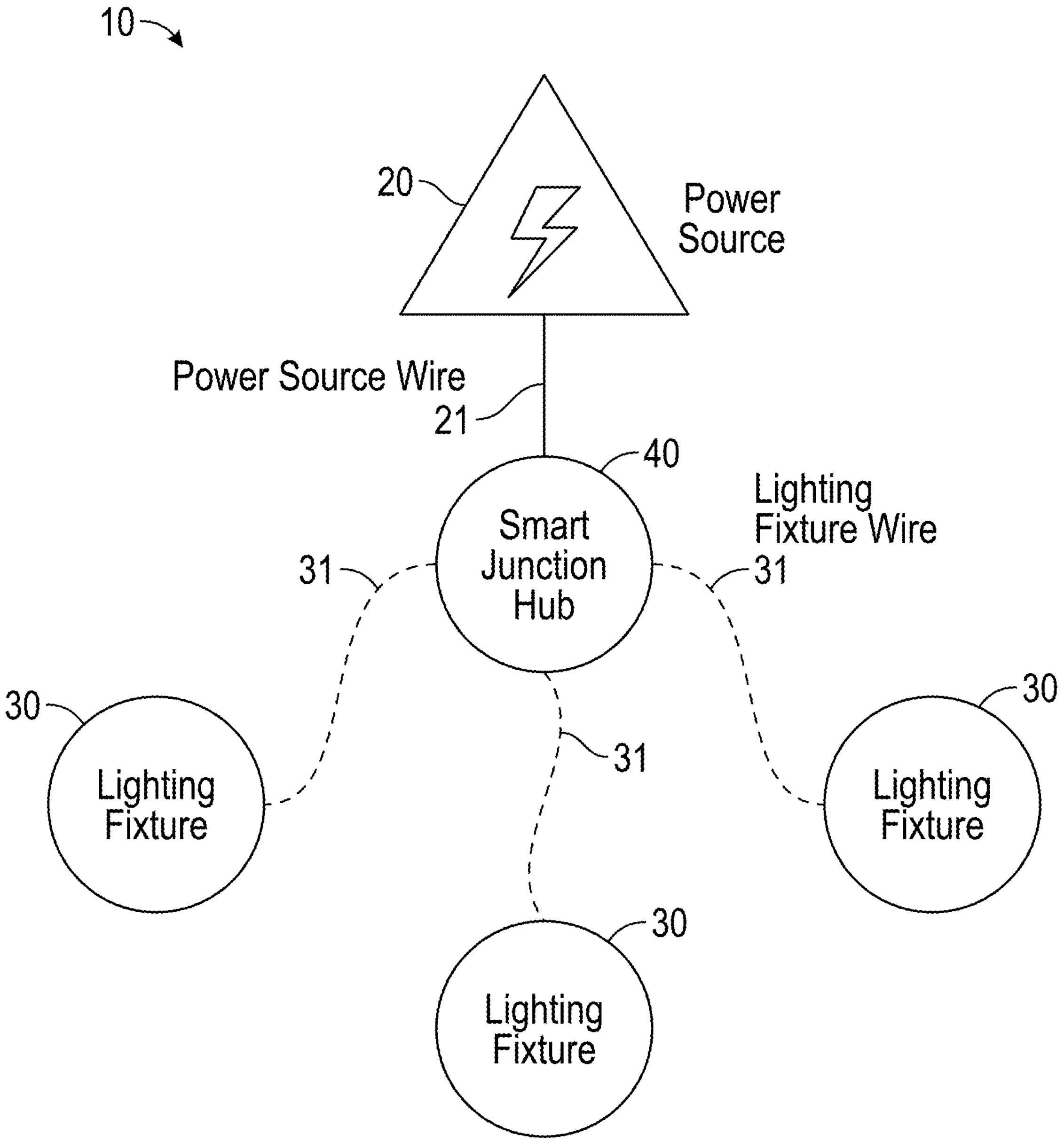
FIG. 1 is a diagrammatic representation of an outdoor lighting system in accordance with an example embodiment.

Turning to FIG. 1, outdoor landscape lighting system 10 is shown. Outdoor landscape lighting system 10 comprises power source 20, lighting fixture 30, and smart junction hub 40. Outdoor landscape lighting system 10 may further comprise additional power sources 20, lighting fixtures 30, and/or smart junction hubs 40. Smart junction hub 40 is connected to power source 20, for example, via power source wire 21. Each lighting fixture 30 is physically and electrically connected to smart junction hub 40 by a respective lighting fixture wire 31.

Each Lighting fixture 30 may be placed where desired in an outdoor landscape and is electrically connected to power source 20 via smart junction hub 40 in a "hub and spoke" layout. In this layout, each lighting fixture 30 is physically and electrically connected by its lighting fixture wire 31 to smart junction hub 40, and smart junction hub 40 is physically and electrically connected to power source 20 via power source wire 21. Inside smart junction hub 40, power source wire 21 and each lighting fixture wire 31 are releasably secured to a wire termination and connection device.

Using smart junction hub 40 in this "hub and spoke" layout reduces the time associated with installing, troubleshooting, or modifying the components of outdoor landscape lighting system 10, for several reasons.

First, in this "hub and spoke" layout, each lighting fixture 30 receives an equal share of the voltage. For lighting fixtures that include certain light sources like incandescent lamps having a narrow range of acceptable voltage, this may be preferable to a so-called daisy-chain layout, where a first lighting fixture 30 is connected directly to power source 20 and then connected to a second lighting fixture, and the second lighting fixture is connected to a third, and so on, in a linear fashion. Such a layout may result in voltage loss the farther along the chain the electrical current travels away from power source 20. Second, the "hub and spoke" layout requires fewer splices to connect multiple lighting fixtures 30 to power source 20 as compared to a layout where each lighting fixture 30 is directly wired to power source 20.

Outdoor landscape lighting system 10 may further comprise additional layout configurations combined with the "hub and spoke" layout, such as the "hub and spoke" layout illustrated in FIG. 1 where each lighting fixture 30 is wired to smart junction hub 40, but then one or more lighting fixtures 30 are then also connected to one or more additional lighting fixtures in a daisy-chain layout or configuration (where such additional fixtures are electrically, but not directly physically, connected to the smart junction hub or power source). Such a combination of the "hub and spoke" layout with another layout configuration may be desirable when lighting fixtures 30 are not grouped, and each lighting fixture 30 features a light source having a wide voltage range tolerance, such as a light-emitting diode (LED).

Power source 20 may comprise a transformer, and preferably, a low voltage transformer. Power source 20 may plug into a standard AC outlet, such as a 120 VAC outlet typically used in North America, and may have AC outputs between 8V-15V. Power source 20 may be mounted outdoors on a stand, or on a structure such as the exterior wall of a home, and is preferably located at least 12 inches above the ground. Alternatively, power source 20 may be located within a structure, such as in the basement or garage of a home. One skilled in the art will appreciate that other types of power sources are within the scope of the invention. For example, power source 20 may be a solar array, a battery, or the like. When outdoor landscape lighting system 10 comprises a plurality of lighting fixture 30 devices, or one or more lighting fixtures 30 are located far from one another or power source 20, more than one power source 20 may be desirable.

Each lighting fixture 30 may be electrically and physically connected to smart junction hub 40 by a respective lighting fixture wire 31. FIG. 1, for example, illustrates three lighting fixtures 30 in outdoor landscape lighting system 10 connected to smart junction hub 40 via respective lighting fixture wires 31. In accordance with various embodiments, outdoor landscape lighting system 10 may include more or fewer lighting fixtures 30, and in layouts combining the hub-and-spoke configuration with daisy-chain or other configurations, may further include additional lighting fixtures electrically connected to a lighting fixture 30 electrically and physically connected to smart junction hub 40.

Each lighting fixture 30 includes a light source such as a lamp, e.g., an incandescent bulb (e.g., a halogen bulb) or integrated light source (e.g., an LED). Each lighting fixture 30 and/or their respective light sources may permit a user to select or adjust brightness/dimness, color, and beam spread via a wireless network (e.g., a BLE mesh network). Moreover, each lighting fixture 30 may further comprise a control board, featuring power supply circuitry that converts the AC voltage received from power source 20 to a DC voltage suitable for lighting fixture 30. Preferably, the total wattage of all lighting fixtures 30 connected to each power source 20 does not exceed about 80% of power source 20's total capacity on average.

Examples of lighting fixture 30 that may be suitable for use in outdoor landscape lighting system 10 include outdoor spotlights (e.g., a flood light), path lights (e.g., guide lights to illuminate walkways, driveways, patios, etc.), hardscape fixtures (e.g., low profile fixtures for illuminating specific landscape features), in-ground lights, underwater lights, outdoor downlights, and other specialty lights (e.g., bistro lights, tiki torches). Lighting fixtures 30 may be disposed on the ground, surface mounted (e.g., on an exterior wall or on a gutter), or attach to a mounting device, e.g., a ground stake, via mount connector 110.

Figure 2:
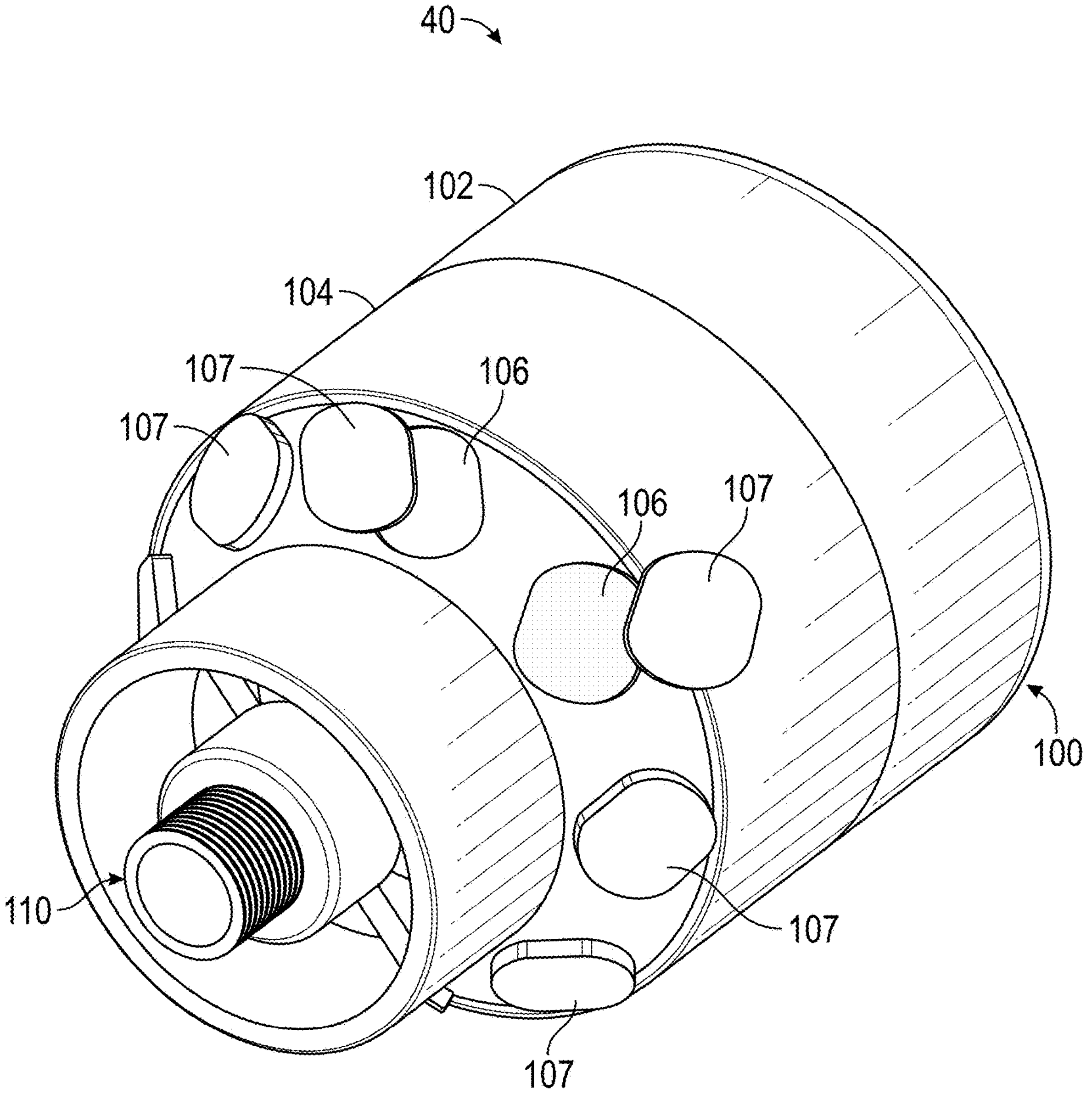
FIG. 2 is a perspective view of a smart junction hub in accordance with an embodiment.
Figure 3:
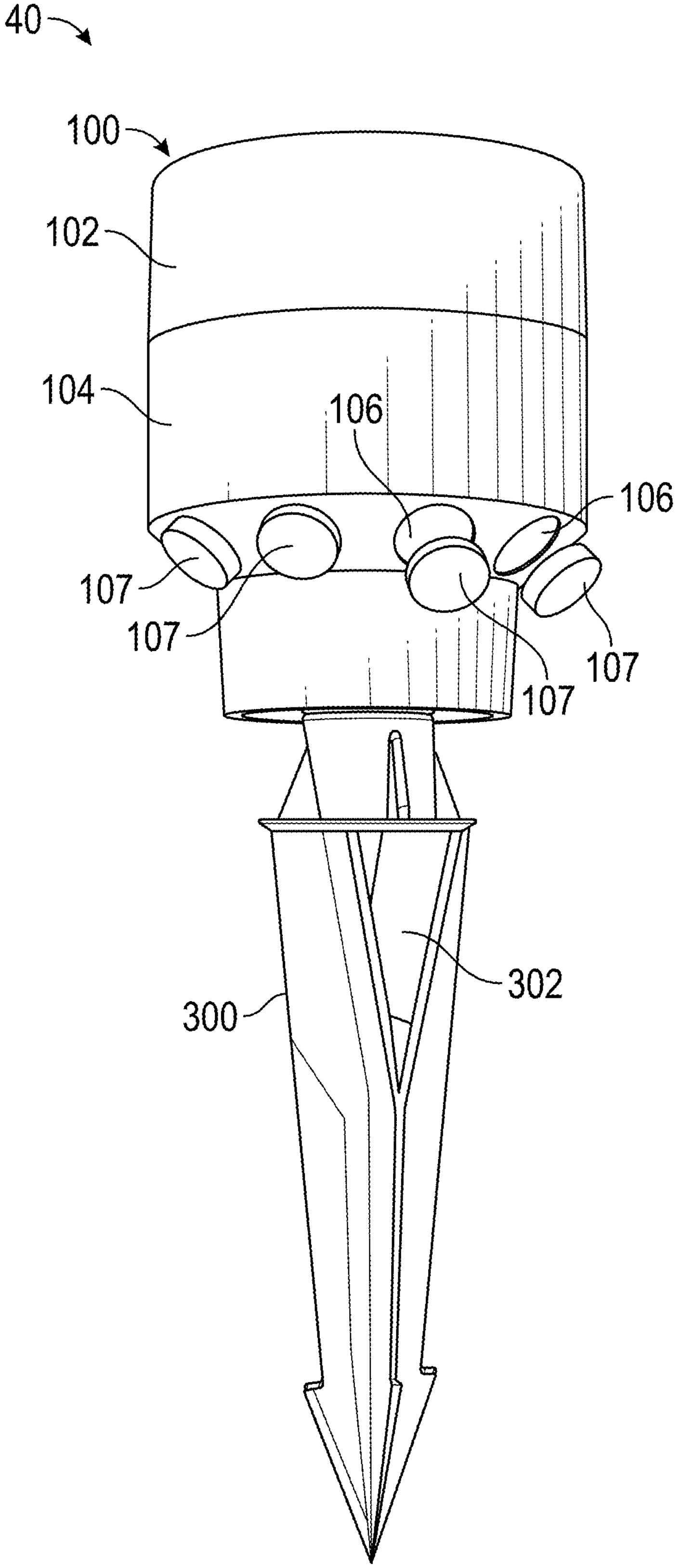
FIG. 3 is a perspective view of a smart junction hub coupled to a mounting device via a mount connection in accordance with an embodiment.

Turning now to FIG. 2, smart junction hub 40 is shown. Smart junction hub 40 comprises a non-metallic body 100 including optional mount connector 110. Non-metallic body 100 provides a housing for components disposed in a cavity of non-metallic body 100 such as wire termination and connection device 400, repeater assembly 401, repeater assembly niche 403, and, in some cases, partition wall 410, and/or other components. Smart junction hub 40 may be coupled to a mounting device, e.g., a ground stake as illustrated in FIG. 3.

Non-metallic body 100 may be constructed of a polymer, plastic, or any other rigid or semi-rigid non-metallic material sufficient to house and support the internal components, resist the incursion of water, dirt, and dust inside the non-metallic body, and not interfere with the operation of repeater assembly 401 or wireless signals, and allow easy access to lighting fixture wiring for users.

Non-metallic body 100 may further include an upper portion, such as cap 102, removably coupled to a bottom portion, or base 104. When cap 102 and base 104 are coupled together, they are substantially flush and thereby non-metallic body 100 resists the intrusion of weather, dirt, and moisture to the interior of the non-metallic body. In some cases, non-metallic body 100 may also include a locking device, such as a locking tab or threads, in order to securely couple cap 102 and base 104 together.

Base 104 of non-metallic body 100 may further define one or more wire openings 106, which may be optionally formed on a sloped surface of non-metallic body 100 that extends annularly around base 104, as shown in FIG. 1. In operation, each wire opening 106 faces generally toward the ground so as to receive wires run along the ground from lighting fixture 30 or power source 20. Power source wire 21 from power source 20 and/or each lighting fixture wire(s) 31 associated with respective lighting fixture(s) 30 may be passed through wire opening 106 to be connected to wire termination and connection device 400.

Each wire opening 106 may further include opening cover 107, e.g., a cap, seal, lid, stopper, plug, or other closure that resists the introduction of outside elements to the interior of non-metallic body 100 when no wire is passed through wire opening 106. In some embodiments, opening cover 107 may be in the form of a slidable cover or a grommet having an expandable aperture for passage of wires formed by a flexible webbing having a weakened portion such as slit that is broken when a wire is initially pushed through it. Opening cover 107 may be fully removable from non-metallic body 100 to enable the passage of a wire, or may be removed from wire opening 106 but remain connected to non-metallic body 100 by an attachment or leash in order to prevent loss of opening cover 107 while a wire is in place and it is not in use.

Non-metallic body 100 of smart junction hub 40 may further include mount connector 110. Mounting device 300 may facilitate the placement of smart junction hub 40 in a desired location in the outdoor environment. Mount connector 110 may extend from an exterior surface of base 104. In some embodiments, a first end of mount connector 110 may be disposed within the interior cavity of non-metallic body 100 of smart junction hub 40, and a second end may be located outside non-metallic body 100 as illustrated in FIG. 2. In some cases, mount connector 110 may be a threaded boss for coupling mounting device 300 (e.g., a ground stake) to non-metallic body 100. Mount connector 110 may also be formed inside non-metallic body 100, e.g. as a threaded area featuring a central bore. In some embodiments, mount connector 110 may further define an opening for the passage of wiring from the exterior to the interior of non-metallic body 100. The opening may be sealed by opening cover 107 as described above when not in use.

In FIG. 3, for example, smart junction hub 40 is shown coupled to mounting device 300 (in this embodiment, a ground stake) via mount connector 110. Mounting device 300 may be pushed or otherwise driven into the ground at a desired location to maintain the position of smart junction hub 40 and may be integral with mount connector 110, or connected to mount connector 110 by press fit, adhesive, or removably coupled together such as via a threaded boss. Mounting device 300 may be constructed of a polymer, or any other rigid or semi-rigid non-metallic material sufficient to support smart junction hub 40 and not interfere with the components disposed within non-metallic body 100. An opening 302 may also be provided for passing wires through a hole aligned with mount connector 110. In this way, wires can extend into non-metallic body 100 through mount connector 110.

Figure 4:
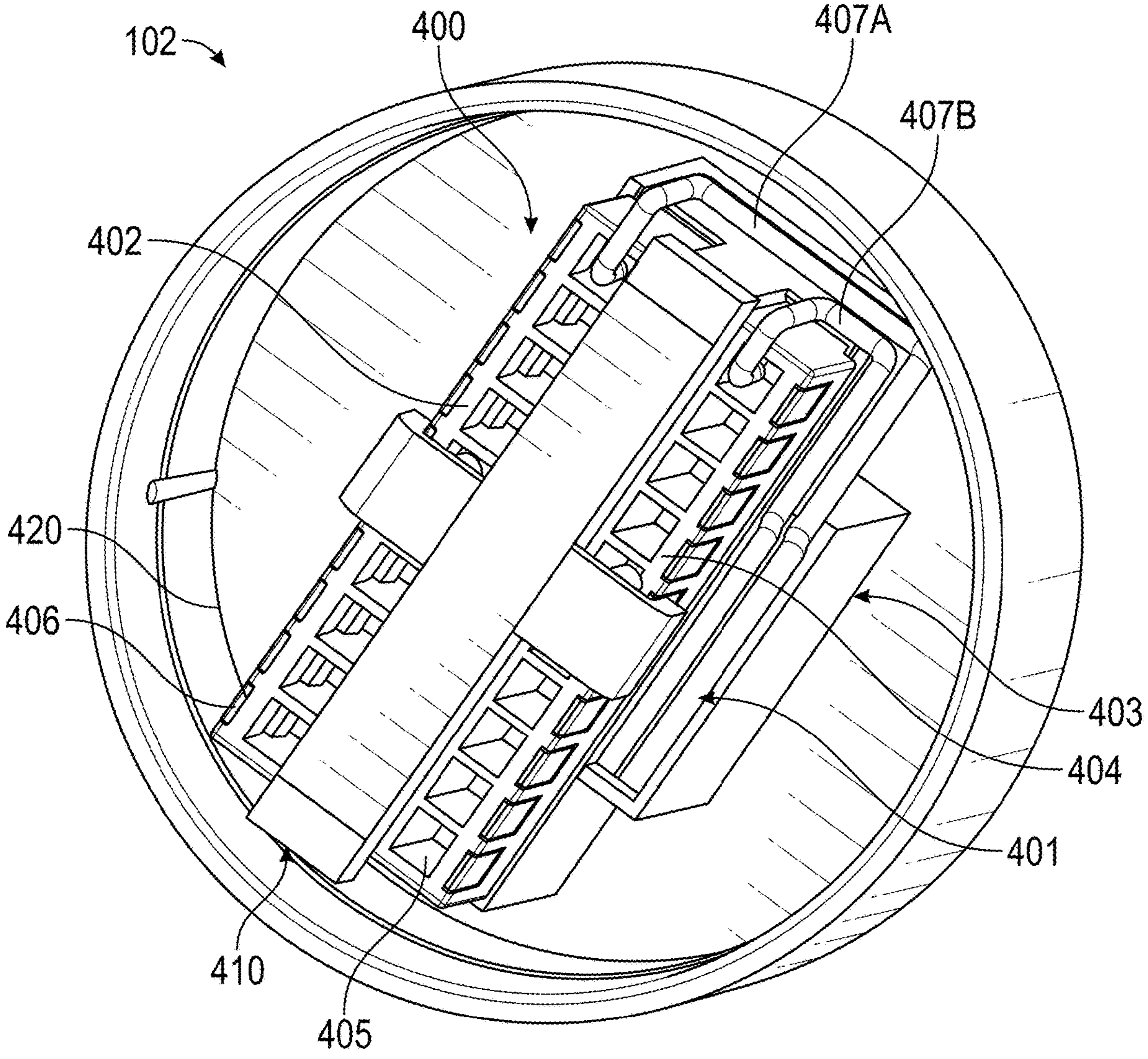
FIG. 4 is a perspective view of the interior of a cap of the non-metallic body of a smart junction hub in accordance with an example embodiment featuring a wire termination and connection device and a repeater assembly.

Turning now to FIG. 4, the interior of cap 102 of non-metallic body 100 can be seen. As shown, wire termination and connection device 400 is proximate to repeater assembly 401 and both are affixed to cap 102 in this embodiment. Repeater assembly 401 may be located elsewhere in non-metallic body 100 so long as wire termination and connection device 400 or its associated wiring does not cause a short or otherwise interfere with the operation of repeater assembly 401.

Wire termination and connection device 400, as illustrated, comprises two separate wire termination and connection devices referred to as first polarity terminal portion 402 and second polarity terminal portion 404. First polarity terminal portion 402 may serve as the positive terminal portion and second polarity terminal portion 404 may serve as the ground (or negative) terminal portion, or vice versa. First polarity terminal portion 402 and second polarity terminal portion 404 are in this example separated and supported by a partition wall 410 situated along a diametrical axis of the cap 102.

In this embodiment, partition wall 410 is integral with the inside of the cap 102 with first polarity terminal portion 402 and second polarity terminal portion 404 being located on opposite sides thereof. Partition wall 410 depends from an interior surface 220 of the cap 102 when cap 102 is coupled to base 104. Partition wall 410 may define at least one gap (or other suitable opening) allowing passage of a fastener for connecting first polarity terminal portion 402 and second polarity terminal portion 404. Tightening the fastener causes a firm connection with first polarity terminal portion 402 and second polarity terminal portion 404.

As shown, wire termination and connection device 400 enables the electrical connection of several devices of outdoor landscape lighting system 10, such as power source 20 and each lighting fixture 30. Wire termination and connection device 400 also provides a convenient place for troubleshooting problems associated with outdoor landscape lighting system 10.

Because wire termination and connection device 400 may serve as a point for connecting each lighting fixture 30 to power source 20, voltage received from power source 20 may be substantially equalized among each lighting fixture 30 connected to wire termination and connection device 400. Additionally, because wire termination and connection device 400 is located in non-metallic body 100, wire termination and connection device 400 is protected from weather elements, while the wiring connections made at wire termination and connection device 400 are secure and dry for improved long-term reliability.

Each of first polarity terminal portion 402 and second polarity terminal portion 404 may have an insulative outer shell defining a plurality of ports 405 each corresponding to a wire securing mechanism such as clamp 406. A stripped end of power source wire 21 or lighting fixture wire 31 may be inserted into a selected port 405 and retained by clamp 406. The stripped end will then be in galvanic connection with a suitable bus bar that connects all of the ports 405 in first polarity terminal portion 402 or second polarity terminal portion 404, as applicable.

As noted above, each port 405 may have a corresponding securing mechanism such as a clamp 406 operable to retain a wire in port 405. In one embodiment, a user can depress a lever or tab associated with the securing mechanism thereby allowing a stripped end to be inserted into port 405, and once inserted into port 405, the user may release the securing mechanism to attach, clip, cramp or otherwise secure the wire within port 405. Because of this design, each lighting fixture wire 31 and power source wire 21 may be connected and disconnected to wire termination and connection device 400 in a simple, easy-to-operate, and reliable manner.

To provide electrical power to a lighting fixture 30, power source wire 21 may be passed through a selected wire opening 106 of non-metallic body 100, and a stripped end of power source wire 21 is then inserted into a selected port 405 of wire termination and connection device 400. A lighting fixture wire 31 connected to a respective lighting fixture 30 may then be passed through another wire opening 106, and a stripped end of lighting fixture wire 31 then inserted into a paired port 405. Securing mechanisms, here, clamp 406 each associated with each of port 405, can be operated to secure the lighting fixture wire 31 and power source wire 21. When power source wire 21 and lighting fixture wire 31 are successfully connected to wire termination and connection device 400, power is able to be provided from power source 20 to lighting fixture 30. One or more of the wires may alternatively be passed through an opening in mount connector 110 (e.g., via a central bore, as discussed above in connection with FIG. 3).

Turning now to FIG. 4, smart junction hub 40 may enable the connection of up to seven light fixtures 30. In other embodiments, first polarity terminal portion 402 and second polarity terminal portion 404 may each include more or less than the eight ports 405 shown, thus enabling power to be provided to more or fewer lighting fixture or other devices.

Non-metallic body 100 may further include repeater assembly 401. Repeater assembly may optionally be disposed in repeater assembly niche 403 as shown in FIG. 4. Repeater assembly niche 403 may be made of non-metallic material and mounted to or optionally integrally formed with cap 102. Repeater assembly niche 403 may also be waterproof to prevent the ingress of any moisture that could adversely affect the components or operation of repeater assembly 401.

Repeater assembly 401 may comprise a printed circuit board (PCB) featuring a chipset for enabling improved wireless signal transmission for a desired wireless network using a desired network protocol, e.g., Bluetooth, Bluetooth Low Energy, Wi-Fi, WiFi3, Zigbee, Z-Wave, LoRa, Sigfox, Ultra Narrow Band (UNB), WiMAX, 6LoWPAN and others. In one embodiment, repeater assembly 401 is operable to extend the range of wireless signals used in a BLE mesh network. BLE-controlled systems may be simpler and more cost-effective to deploy and run ZigBee- or Wi-Fi-controlled systems because BLE-enabled systems do not require a gateway or dongle, thereby eliminating single points of failure.

As shown FIG. 4, repeater assembly 401 is powered by connecting repeater assembly wire 407A and repeater assembly wire 407B between repeater assembly 401 and wire termination and connection device 400. For example, repeater assembly wire 407A connects repeater assembly 401 to port 405 disposed on the end of first polarity terminal portion 402, and repeater assembly wire 407B connects repeater assembly 401 to port 405 disposed on the end of second polarity terminal portion 404. Connecting repeater assembly 401 to power within smart junction hub 40 avoids the need add separate or standalone wireless network devices, or devices that will need to be independently wired and connected to power.

It can thus be seen that the present invention provides various embodiments of a novel landscape lighting junction hub. Many modifications and other embodiments of the invention set forth herein will come to mind to one skilled in the art to which the invention pertains having the benefit of the teachings presented in the foregoing descriptions and the associated drawings. For example, some embodiments are contemplated in which wires are connected together inside smart junction hub 40 by using alternative securing mechanisms or devices, e.g., conventional wire nuts. Therefore, it is to be understood that the invention is not to be limited to the specific embodiments disclosed and that modifications and other embodiments are intended to be included within the scope of the appended claims.

Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required, or essential to all embodiments or to that which is claimed herein. Although specific terms are employed herein, they are used in a generic and descriptive sense only and not for purposes of limitation.

We claim:

1. A smart junction hub for use in an outdoor landscape lighting system comprising:

a non-metallic body, wherein the non-metallic body comprises a cap and a base removably coupled together to define an interior;

a wire termination and connection device disposed in the interior of the non-metallic body and affixed to the cap;

a repeater assembly, disposed in the interior of the non-metallic body in a repeater assembly niche that is integrated with the cap and located proximate to the wire termination and connection device, comprising a printed circuit board and chipset for receiving and transmitting wireless signals in a wireless communication network and is powered by one or more repeater assembly wires connected to the wire termination and connection device;

a mount connector for attaching a mounting device to the non-metallic body; and wherein the wire termination and connection device further comprises a plurality of ports and corresponding securing mechanisms each for releasably securing one of a power source wire connected to a remote power source or a lighting fixture wire connected to a remote lighting fixture.

2. The smart junction hub of claim 1, wherein the base of the non-metallic body defines an opening for receiving the power source wire or the lighting fixture wire.

3. The smart junction hub of claim 1, wherein the mounting device is a ground stake.

4. The smart junction hub of claim 1, wherein the mount connector is a threaded boss.

5. The smart junction hub of claim 1, wherein the mount connector has a central bore.

6. The smart junction hub of claim 1, wherein the base defines one or more wire openings.

7. The smart junction hub of claim 6, further comprising one or more opening covers corresponding to each of the one or more wire openings, to close the one or more wire openings when not in use.

8. The smart junction hub of claim 1, wherein the wire termination and connection device further comprises a first polarity terminal portion and a second polarity terminal portion.

9. The smart junction hub of claim 8, wherein the first polarity terminal portion is disposed on a first side of a partition wall and the second polarity terminal portion is disposed on a second side of the partition wall.

10. The smart junction hub of claim 8, wherein the first polarity terminal portion and the second polarity terminal portion are disposed in respective diametrically opposed receptacles.

11. The smart junction hub of claim 1, wherein the corresponding securing mechanisms are clamps.

12. The smart junction hub of claim 1, wherein the non-metallic body is substantially comprised of a rigid plastic material.

13. The smart junction hub of claim 1, wherein the non-metallic body further comprises a locking tab or threads to securely couple the cap and the base together.

14. The smart junction hub of claim 1, wherein the plurality of ports and corresponding securing mechanisms enable connection of the wire termination and connection device to a plurality of light fixtures.

15. The smart junction hub of claim 1, wherein the repeater assembly is disposed in a repeater assembly niche made of a non-metallic material.

16. The smart junction hub of claim 15, wherein the repeater assembly niche is substantially waterproof.

17. The smart junction hub of claim 1, wherein the wireless communication network's protocol is a wireless mesh network based upon a low energy communication protocol wherein messages are relayed in a many-to-many configuration.

18. The smart junction hub of claim 1, wherein the repeater assembly extends wireless signal range used in a wireless mesh network based upon a low energy communication protocol wherein nodes messages are relayed in a many-to-many configuration.

19. The smart junction hub of claim 1, wherein the repeater assembly receives and re-transmits wireless signals in a wireless mesh network based upon a low energy communication protocol wherein n messages are relayed in a many-to-many configuration configured to control the remote lighting fixture.

20. An outdoor landscape lighting system configured in a hub-and-spoke layout, comprising:

a smart junction hub;

a power source connected to the smart junction hub by a power source wire;

a plurality of lighting fixtures each connected to the smart junction hub by corresponding lighting fixture wires;

wherein the smart junction hub further comprises (i) a non-metallic body having a cap and a base removably coupled together to define an interior of the non-metallic body, (ii) a wire termination and connection device disposed in the interior of the non-metallic body and affixed to the cap, (iii) a repeater assembly, disposed in the interior of the non-metallic body and within a repeater assembly niche that is integrated with the cap and located proximate to the wire termination and connection device, comprising a printed circuit board and chipset for communicating wireless signals in a wireless communication mesh network based upon a low energy communication protocol wherein n messages are relayed in a many-to-many configuration to control the remote lighting fixture, and connected to the wire termination and connection device by a repeater assembly wire; and (iv) a mount connector for attaching the non-metallic body to a mounting device, and further wherein the wire termination and connection device has a plurality of ports and a plurality of securing mechanisms corresponding to each of the plurality of ports for releasably securing one of the power source wire, the lighting fixture wires, or the repeater assembly wire.

* * * * *